United States Patent
Archambeau et al.

(10) Patent No.: US 8,542,426 B2
(45) Date of Patent: Sep. 24, 2013

(54) TRANSPARENT ELECTROCHROMIC SYSTEM WITH A PLURALITY OF PAIRS OF SUPPLY ELECTRODES

(75) Inventors: Samuel Archambeau, Charenton-le-Pont (FR); Claudine Biver, Charenton-le-Pont (FR); Jean-Paul Cano, Charenton-le-Pont (FR); Sandrine Duluard, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 31 days.

(21) Appl. No.: 13/497,217

(22) PCT Filed: Sep. 24, 2010

(86) PCT No.: PCT/FR2010/052012
§ 371 (c)(1),
(2), (4) Date: Mar. 20, 2012

(87) PCT Pub. No.: WO2011/036419
PCT Pub. Date: Mar. 31, 2011

(65) Prior Publication Data
US 2012/0176661 A1 Jul. 12, 2012

(30) Foreign Application Priority Data
Sep. 28, 2009 (FR) .................................. 09 56701

(51) Int. Cl.
*G02F 1/153* (2006.01)

(52) U.S. Cl.
USPC .......................................... 359/275; 359/270

(58) Field of Classification Search
USPC .................................................. 359/265–275
See application file for complete search history.

(56) References Cited

U.S. PATENT DOCUMENTS

| | | | |
|---|---|---|---|
| 4,212,518 A * | 7/1980 | Imataki et al. ............... | 359/272 |
| 4,218,120 A | 8/1980 | Kawamura et al. | |
| 4,285,575 A | 8/1981 | Imataki et al. | |
| 5,142,407 A | 8/1992 | Varaprasad et al. | |
| 6,950,220 B2 * | 9/2005 | Abramson et al. ............ | 359/265 |
| 2002/0005977 A1 | 1/2002 | Guarr et al. | |
| 2004/0241517 A1 * | 12/2004 | Shinozaki et al. .............. | 429/33 |
| 2005/0128560 A1 * | 6/2005 | Vincent et al. ................. | 359/265 |
| 2009/0195883 A1 | 8/2009 | Archambeau et al. | |
| 2012/0120477 A1 * | 5/2012 | Biver et al. .................... | 359/275 |
| 2012/0307340 A1 * | 12/2012 | Archambeau et al. ......... | 359/275 |

FOREIGN PATENT DOCUMENTS

| JP | 59-219723 A | 12/1984 |
|---|---|---|
| JP | 2006-119344 A | 5/2006 |

* cited by examiner

*Primary Examiner* — Evelyn A. Lester
(74) *Attorney, Agent, or Firm* — Robert Iannucci; Seed IP Law Group PLLC (57) ABSTRACT

The invention relates to a transparent electrochromic system (100) which includes two pairs of transparent supply electrodes (1-4), which are intended for being electrically connected to variable power sources (20, 21). The electrodes of the two pairs are supported by separate outer walls (10, 11) of the system, on either side of a closed volume which contains electroactive substances. The electrochromic system has superior dynamics and switching rate. Various embodiments of the invention correspond to various modes for connecting the electrodes to the power sources, and to various partitions of the closed volume into separate cells (13).

17 Claims, 4 Drawing Sheets

TRANSPARENT ELECTROCHROMIC SYSTEM WITH A PLURALITY OF PAIRS OF SUPPLY ELECTRODES

The present invention relates to a transparent electrochromic system with a plurality of pairs of supply electrodes, as well as an electrochromic device comprising such a system.

In a known manner, an electrochromic system is a transparent element the optical characteristics of light transmission of which can vary in response to an electric current applied between two supply terminals of the system. To this end, an electrochromic system usually comprises:

two outer walls defining a closed volume, the system being transparent for a direction of gaze passing through the outer walls and the closed volume between two opposite sides;

a liquid or gel contained in the closed volume;

first and second electroactive substances distributed in the liquid or gel, with respective oxidation-reduction potential values that are different, at least some of the first and second electroactive substances having an optical effect that varies between an oxidised form and a reduced form of these substances; and a pair of transparent supply electrodes, intended to be connected respectively to two output terminals of a variable electrical source for supplying the system with electric current, so as to transfer electrons to or from at least some of the electroactive substances, in a reverse mode between the first and second electroactive substances at a same moment of operation of the system.

Within the framework of the present invention, by transparent element is meant an optical element that provides a user situated on one side of the element with a clear view through this element, of objects situated on another side of and at a distance from the element. In other words, an image of the object is formed on the retina of the user by the light that propagates over a first non-zero distance between the object and the transparent element, then passes through the transparent element and propagates over a second non-zero distance between the transparent element and an eye of the user. To this end, a light diffusion and/or diffraction caused by the optical element must be sufficiently low, so that the image of an object point through the transparent element is an image point and not a diffuse spot in the image that is perceived by the user.

Such an electrochromic system is intended to vary the light transmission value through this system, between a clear state for which the light transmission has a high value, and a dark state for which it has a low value. Some applications require the light transmission of the clear state to be very high, and also the light transmission of the dark state to be very low. In other words, electrochromic systems are sought which each have significant switching dynamics. Such significant switching dynamics are particularly useful when the electrochromic system is intended to be used alternatively outside and inside a building. In fact, the ambient luminosity can be very high outside in conditions of sunshine, while the luminosity inside the building remains average or low.

An object of the invention consists of proposing a structure for an electrochromic system that makes it possible to increase the switching dynamics.

A further object of the invention consists of proposing a structure for an electrochromic system that is simple to manufacture.

Yet another object of the invention consists of proposing an electrochromic system that has a high speed of switching between the different light transmission values.

In order to achieve these and other objects, the present invention proposes a transparent electrochromic system of the above-mentioned type that provides clear vision through the system and comprises at least two pairs of transparent supply electrodes. The supply electrodes of a first pair are carried together by a single one of the two outer walls. Moreover, they are intended to be connected respectively to two output terminals of a variable electrical source for supplying the system with electric current, so as to transfer electrons to or from at least some of the electroactive substances, in a reverse mode between the first and second electroactive substances at a same moment of operation of the system. In other words, the two electrodes of the first pair are isolated with respect to each other within the electrochromic system, while being situated on the same side of the volume that contains the electroactive substances.

In parallel, the transparent supply electrodes of a second pair, which are separate from those of the first pair, are carried together by the other one of the two outer walls to that carrying the electrodes of the first pair. Moreover, for their function of supplying the system with electric current, the supply electrodes of the second pair are intended to be connected respectively to two output terminals of a second variable electrical source, for supplying the system with electric current additionally with respect to the first pair of electrodes, by also transferring electrons to or from at least some of the electroactive substances, in a reverse mode between the first and second electroactive substances at the same moment of operation of the system.

The two electrodes of the second pair are thus also isolated with respect to each other within the electrochromic system, while being situated together on the other side of the volume that contains the electroactive substances with respect to the electrodes of the first pair. Moreover, each electrode of one of the pairs is isolated within the system with respect to each electrode of the other pair, in order to allow the electrochromic system to be supplied with electricity independently and simultaneously by each pair of electrodes. Put another way, each pair of electrodes with the electrical source to which it is connected, implements a supply of the electrochromic system which is autonomous and separate from the other pair of electrodes with the other electrical source.

The two separate pairs of supply electrodes therefore constitute two parallel circuits for providing electric current to the electrochromic system. Generally, the two electrical sources that supply the electrochromic system with current, respectively by the first pair of electrodes and by the second pair of electrodes, may be independent. Thus, a greater total electric current can be delivered to the electrochromic system, so that the system can have an increased switching speed between different light transmission values.

Moreover, given that the electrodes of a single pair are situated on one side of the volume containing the electroactive substances which is opposite with respect to the electrodes of the other pair, electroactive species can be converted between their oxidized and reduced forms simultaneously on both sides of this volume. When the electroactive substances are thus converted simultaneously on each side of the closed volume, in the same direction of the oxidation-reduction reactions, their effects on the light transmission of the system are combined so that the electrochromic system has increased switching dynamics.

Moreover, given that all the electrodes are supported by the outer walls of the system, this latter is simple to manufacture. Each electrode may be produced in the form of a thin layer deposited on the corresponding outer wall, without the need for additional support elements within the electrochromic system. Moreover, the two pairs of electrodes may have identical patterns, each on the corresponding outer wall, so that a single mask can be used for both outer walls, in order to define these patterns.

In various embodiments of electrochromic systems according to the invention, the closed volume which contains the liquid or gel in which the electroactive substances are distributed may be divided into juxtaposed cells parallel to the outer walls. In this case, each cell contains a portion of the liquid or gel that may be in contact, within this cell, with only one or both electrodes of each pair.

An electrochromic system according to the invention can form at least one portion of many optical components, such as a spectacle eyeglass, a goggles eyeglass, an optical lens, a helmet visor, an aeroplane window, a glazing, etc.

Finally the invention also proposes an electrochromic device comprising:
 a transparent electrochromic system such as described previously;
 the first variable electrical source, with the two output terminals of this first electrical source that are connected respectively to the supply electrodes of the first pair; and
 the second variable electrical source, with the two output terminals of this second electrical source that are connected respectively to the supply electrodes of the second pair.

Each of the first and second variable electrical source is adapted to supply the electrochromic system with electric current by applying between the electrodes of the corresponding pair a first or a second electrical voltage respectively that is greater than the difference between the respective oxidation-reduction potentials of the first and second electroactive substances.

In simplified embodiments of devices according to the invention, the first and second electrical sources may be merged in a single electrical source common to the two pairs of supply electrodes, with electrical connections connecting one of the output terminals of this electrical source common to one of the electrodes of the first pair and to one of the electrodes of the second pair, and which separately connect the other output terminal of the common electrical source to the other electrode of the first pair and to the other electrode of the second pair, following a parallel connection mode.

Other features and advantages of the present invention will become apparent from the following description of non-limitative embodiments, with reference to the attached drawings, in which.

For reasons of clarity, the dimensions of the different elements represented in these figures do not correspond to actual dimensions and dimensional relationships. Moreover, identical references that are given in different figures denote identical elements, or those having identical functions.

Moreover, by way of illustration, the systems that are now described are intended to form spectacle eyeglasses, but it is understood that they can form other transparent elements, in particular by suitably adapting the outer walls of these systems.

Figure 1A:
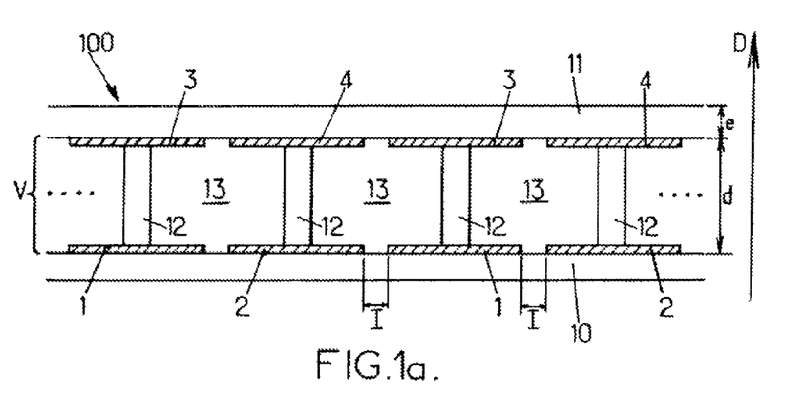
FIGS. 1a and 1b are sectional views of two electrochromic systems according to the invention.
Figure 1B:
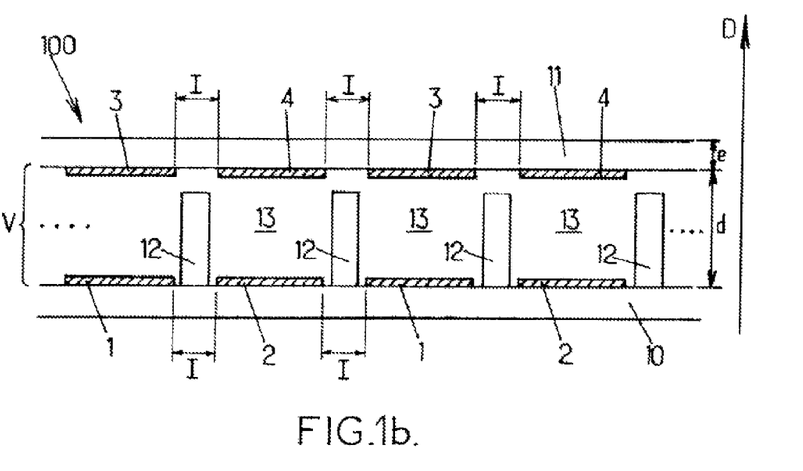

According to FIGS. 1a and 1b, an electrochromic system 100 contains two parallel outer walls 10 and 11, delimiting an inner volume V. The volume V is sealed closed, for example by using a peripheral seal, not shown. The outer walls 10 and 11 may be a flexible film, such as a polyethylene terephthalate (PET) film, a polycarbonate (PC) film or a polyimide film. Such a film may have a thickness e that is comprised between 30 of 200 μm (micrometer). The outer wall 10 may also be a spectacle eyeglass, made of a mineral, organic or hybrid material commonly used in the ophthalmic field.

Each of the outer walls 10, 11 carries a pair of electrodes on its face turned towards the volume V: the electrodes 1 and 2, together forming a first pair, are carried by the outer wall 10, and the electrodes 3 and 4, together forming a second pair, are carried by the outer wall 11. All the electrodes 1 to 4 are electrically isolated from each other within the system 100, and are in contact with a liquid or gel contained in the volume V. The electrodes 1 to 4 may be made of tin-doped indium oxide (ITO for indium-tin oxide) or fluorine-doped tin oxide ($SnO_2$:F). They may be deposited on the corresponding inner faces of the walls 10, 11 in the form of patterned thin layers, with a layer thickness comprised between 0.1 μm and 3 μm, for example. Advantageously, the electrodes of each pair are situated one by one opposite the electrodes of the other pair, on either side of the volume V, along a direction D perpendicular to the outer walls 10 and 11. Thus, the electrode 3 can be opposite the electrode 1, and the electrode 4 opposite the electrode 2. On each outer wall 10 and 11, the electrodes of the pair carried by this wall may have any respective complementary patterns, while remaining separated from each other by a gap I parallel to the outer wall. This gap I can ensure that the electrodes of the same pair are electrically isolated from each other. In particular, the electrodes may have comb patterns, with comb teeth that are arranged with an alternating pitch that may be comprised between 50 μm and 1.5 mm (millimeter), for example. The gap I may have a width of 18 μm, for example.

The thickness d of the volume V in the direction D may be 20 μm, for example.

The outer walls 10 and 11 as well as the electrodes 1 to 4 are transparent for light beams passing through the system 100 between two opposite sides of the latter, in particular parallel to the direction D.

The fluid medium that is enclosed in the volume V is a liquid or a gel, according to its composition. It contains the electroactive substances that are intended to be oxidised or reduced on the supply electrodes 1 to 4 during operation of the system 100. It may also contain other additives such as a solvent common to the electroactive substances, anti-UV agents, plasticisers, etc.

The electroactive substances that are contained in the volume V may be, by way of illustrative example:
 N,N,N',N' tetramethyl-phenylenediamine, that has an oxidation-reduction potential value of approximately 0.2 V (volt) with respect to a saturated mercurous chloride reference electrode. It is colourless in its reduced form and blue in its oxidised form; and
 ethyl viologen diperchlorate, or N,N' diéthyl-4,4' bipyridinium diperchlorate, that has an oxidation-reduction potential value of approximately −0.7 V with respect to a saturated mercurous chloride electrode. It is colourless in its oxidised form and blue in its reduced form.

When there is zero voltage between the two supply electrodes of a single pair, the first of these two substances is in its reduced form, and the second in its oxidised form, owing to their respective oxidation-reduction potential values. The electrochromic system is then in its clear state, with a high light transmission value, for example greater than 70%, and preferably greater than 80%. When the voltage applied between the two supply electrodes of the same pair is higher than approximately 0.9 V, the N,N,N',N' tetramethyl-phenylenediamine is oxidised on contact with the one of these electrodes that is connected to the positive output terminal of the corresponding source of electrical supply, and the ethyl-viologen is reduced on contact with the other electrode that is connected to the negative output terminal of the same source. The electrochromic system 100 then becomes absorbing with a blue colour. Its light transmission can then be less than 7%, for example, when the two pairs of supply electrodes are used according to the invention, even less than 2%, as a function of the concentrations of the electroactive species in particular.

These two electroactive substances may be introduced into the volume V each with a concentration comprised between 0.001 and 1 mol·l-1 (mole per liter), as a function of the desired light absorption level for the absorbing state of the electrochromic system 100. For example, the concentrations of the two abovementioned electroactive species can be equal to 0.2 mol·l$^{-1}$.

In particular embodiments of the invention, and optionally, the system 100 may further comprise a network of inner walls 12, forming a partition of the volume V into juxtaposed cells 13 parallel to the outer walls 10 and 11. The inner walls 12 are perpendicular to the outer walls 10 and 11, and divide the liquid or gel contained in the volume V into portions of liquid or gel that are respectively contained in the cells 13. The composition and the embodiment of the walls 12 are assumed to be known to a person skilled in the art and are not repeated here. For example, the walls 12 may each have a thickness that is greater than 0.1 μm, preferably comprised between 0.5 and 8 μm, and each cell 13 may have a dimension comprised between 50 μm and 1.5 mm for example, parallel to the outer walls 10 and 11. The cells 13 then form a tessellation of the electrochromic system 100, parallel to the walls 10 and 11, having any regular pattern whatever, for example hexagonal, or random or pseudo-random.

According to a first mode of partitioning the volume V shown in FIG. 1a, the two supply electrodes of each pair are each in contact with the liquid or gel contained in each cell 13, and the liquid or gel contained in each cell contains both the first and the second electroactive substances. Thus, the two electrodes 1 and 2 are in contact with the portions of liquid or gel of all the cells 13, in the same way as the two electrodes 3 and 4. According to an advantageous embodiment, some of the inner walls 12 may extend between the electrodes 1 and 3, and other inner walls 12 between the electrodes 2 and 4, with extensions of the electrodes on either side of each corresponding inner wall 12, parallel to the outer walls 10 and 11. Thus, each of the electrodes 1 to 4 extends continuously between adjacent cells 13, and each cell 13 can be supplied by the four electrodes 1-4, by the respective prolongations of same within this cell.

According to a second mode of partitioning the volume V shown in FIG. 1b, for at least some of the cells 13, a single one of the two supply electrodes 1 and 2 of the first pair, and a single one of the two electrodes 3 and 4 of the second pair, are in contact with the liquid or gel contained in each cell. In this case, a first cell 13 supplied by one of the supply electrodes of each pair is adjacent to a second cell 13 supplied by the other electrode of each pair. According to a possible embodiment, some of the inner walls 12 can extend between the outer walls 10 and 11 at the level of the inter-electrode separation gaps I on these two outer walls.

According to FIGS. 2a, 2b, 3a and 3b, a first variable electrical source 20 is electrically connected by two current output terminals of this first source, to the electrodes 1 and 2 of the first pair of electrodes. Simultaneously, a second variable electrical source 21, different from the source 20, is electrically connected by two current output terminals of this second source, to the electrodes 3 and 4 of the second pair of electrodes. Each of the sources 20 and 21 is capable of producing between its output terminals, an electrical voltage that is greater than or equal to the difference between the respective oxidation-reduction potential values of the first and second substances. Thus, the source 20 and the electrodes 1 and 2 form a first electrical supply assembly of the electrochromic system 100. Similarly, the source 21 and the electrodes 3 and 4 form a second electrical supply assembly of the same electrochromic system 100.

The electrical sources 20 and 21 may be adapted in order to simultaneously supply the electrical system 100 with electric current. Moreover, their polarities with respect to the supply electrodes of the system 100 to which they are connected may be reversed in a synchronised manner, to produce switching of the system 100 from the clear state to the dark state and vice-versa.

The two sources 20 and 21 may be of the direct current source or pulse current source type.

Optionally, the two sources 20 and 21 may each have an electrical potential reference terminal that is separate from the current output terminals of these sources, with an electrical connection 23 connecting these electrical potential reference terminals to each other.

Figure 2A:
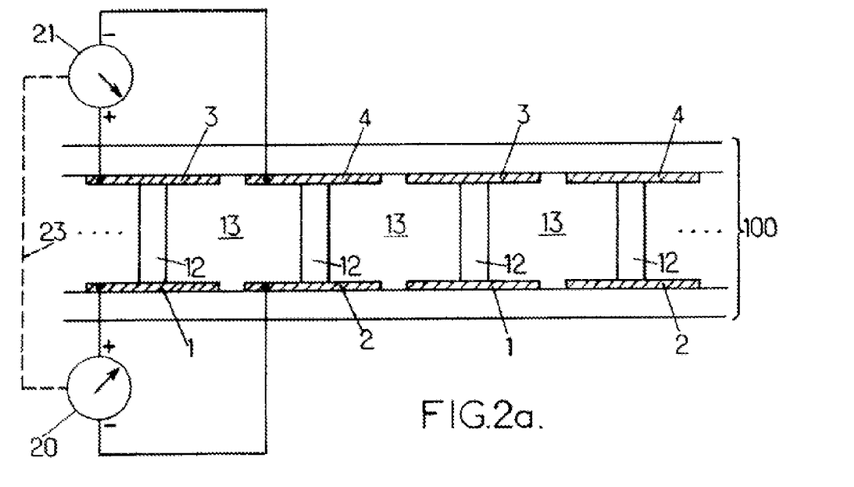
FIGS. 2a and 2b represent electrochromic devices comprising a system according to FIG. 1a, with different modes of electrical connection.
Figure 3A:
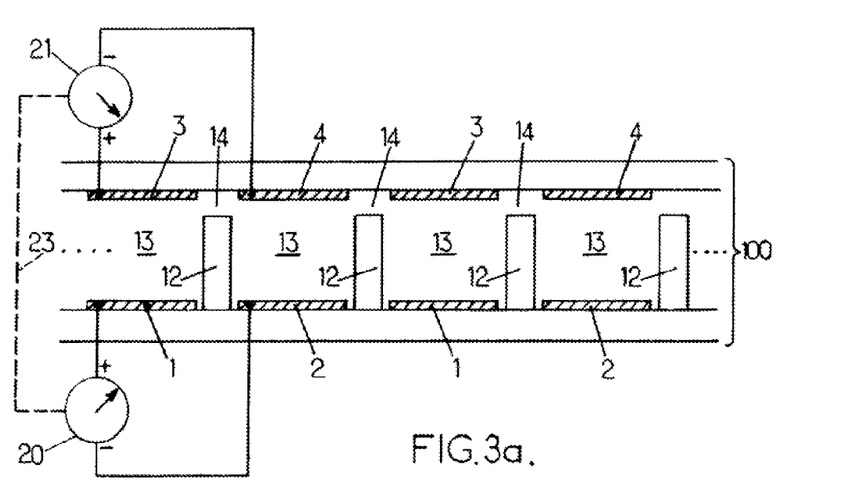
FIGS. 3a and 3b correspond respectively to FIGS. 2a and 2b, for an electrochromic system according to FIG. 1b.

According to a first possibility for the electrical connection of the sources 20 and 21, when the electrodes of each pair are opposite, one by one, the electrical sources 20 and 21 may be connected to the electrodes of the first and second pairs, respectively, so that the electrical sources 20 and 21 have respective polarities that are identical with respect to the electrodes situated opposite, at least at some moments of operation of the system. FIGS. 2a and 3a show this first connection possibility respectively for the structures of the system 100 in FIGS. 1a and 1b. In this case, identical oxidation-reduction reactions are caused simultaneously on the electrodes situated opposite. For example, at a moment when the electrodes 1 and 3 are connected to the positive output terminals of sources 20 and 21, respectively, tetramethyl-phenylenediamine molecules are oxidised at the same time on these two electrodes 1 and 3. Simultaneously, ethyl-viologen diperchlorate molecules are reduced both on the electrode 2 and on the electrode 4. To this end, the two sources 20 and 21 have at the same time output voltages higher than approximately 0.9 V between their respective output terminals. A darkening of the system 100 is then achieved. Conversely, a lightening of the system 100 is obtained when the sources 20 and 21 are switched so that the electrodes 1 and 3 are now connected to the negative output terminals of these sources, and the electrodes 2 and 4 to the positive output terminals. During this lightening, tetramethyl-phenylenediamine molecules are reduced at the same time on the two electrodes 1 and 3, and ethyl-viologen diperchlorate molecules are oxidised simultaneously on the two electrodes 2 and 4.

When the system 100 has a partition into cells with a single electrode of each pair for supplying each cell 13 (FIG. 3a), an ion bridge 14 may be provided in the system 100 between neighbouring cells 13 that are respectively supplied by different electrodes of each pair. Such an ion bridge may be produced by one of the methods currently used in electrochemistry. For example, the ion bridges 14 may be situated at the ends of the inner walls 12, for example on the side of the outer wall 11. They may also be produced in the inner walls 12, in particular when the latter are permeable to ions of small sizes that are contained in the liquid or gel with the electroactive substances. Such ion bridges 14 provide an electrical neutrality of the content of each cell 13 at each moment of operation of the system 100. They thus make it possible to keep the system 100 in any state whatsoever in a stationary manner.

When only one electrode of each pair supplies each cell 13 of the system 100, the liquid or gel may contain first electroactive substances without second electroactive substances within the cells 13 that are supplied by one of the electrodes of each pair, and second electroactive substances without first electroactive substances within the cells 13 that are supplied by the other electrode of each pair. For example, for the method of partitioning the volume V and the method of electrical connection in FIG. 3a, it is possible for those cells 13 supplied by the electrodes 1 and 3 to contain only tetramethyl-phenylenediamine molecules, and those of the cells 13 which are supplied by the electrodes 2 and 4 to contain only ethyl-viologen diperchlorate molecules. In this case, the system 100 is in the clear state before being switched for the first time after its manufacture, and this first switching is carried out by connecting the electrodes 1 and 3 to the positive output terminals of the sources 20 and 21.

Figure 2B:
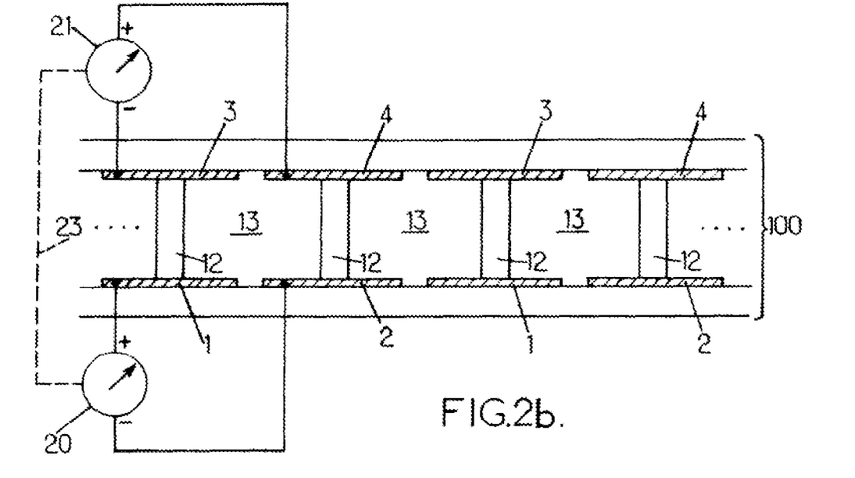
Figure 3B:
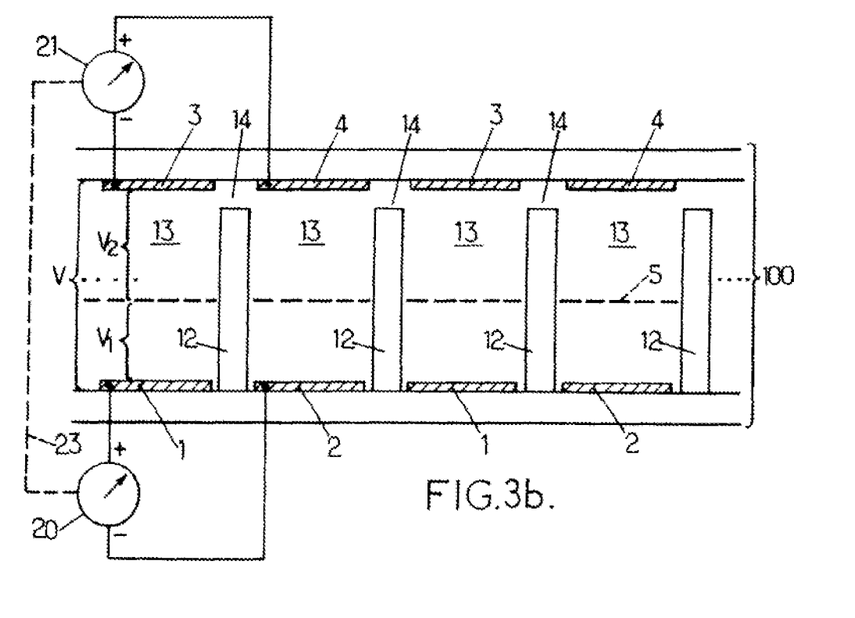

According to a second possibility for the electrical connection of the sources 20 and 21, when the electrodes of each pair are opposite, one by one, the electrical sources 20 and 21 may be connected to the electrodes of the first and second pairs, respectively, so that the electrical sources 20 and 21 have respective polarities that are reversed with respect to the electrodes situated opposite, at least at some moments of operation of the system. FIGS. 2b and 3b show this second connection possibility respectively for the structures of the system 100 of FIGS. 1a and 1b. In this case, the first and the second electroactive substances simultaneously undergo oxidation and reduction reactions, respectively on the electrodes situated opposite each other. To this end, the liquid or gel contained in each cell 13 contains both first and second electroactive substances. Thus, the same light beam that passes through the system 100 parallel to the direction D is sensitive simultaneously to the coloured forms of the first and second substances, or simultaneously to their colourless forms. For example, when the electrode 1 is connected to the positive output terminal of the source 20, the electrode 3 is connected to the negative output terminal of the source 21. The electrode 2 is then connected to the negative output terminal of the source 20 and the electrode 4 to the positive output terminal of the source 21. The tetramethyl-phenylenediamine molecules are then oxidised simultaneously on the electrodes 1 and 4, while the ethyl-viologen diperchlorate molecules are simultaneously reduced on the electrodes 2 and 3. The system 100 then appears dark, with a uniform colour if the separation gaps I are sufficiently narrow. Conversely, when the polarities of the two sources 20 and 21 are exchanged, i.e. the two electrodes 1 and 4 are connected to the negative output terminals of the corresponding sources, and the electrodes 2 and 3 to their positive output terminals, the tetramethyl-phenylenediamine molecules are reduced again on the electrodes 1 and 4, and the ethyl-viologen diperchlorate molecules are re-oxidised on the electrodes 2 and 3. The system 100 therefore reverts to the clear state.

For this second possibility for the electrical connection of the sources 20 and 21, each cell 13, with the electrodes that supply it with electrical current, constitutes an elementary electrochromic system. The inner walls 12 may then form an electrical insulation between neighbouring cells 13. However, in this case and for the partition in FIG. 3b, it may be preferable for the sources 20 and 21 to be set to supply the system 100 with electrical currents that are substantially equal at each moment.

The oxidised and reduced forms of the electroactive substances that are produced on electrodes situated opposite each other, with opposite polarities, may implement mutual neutralisation close to the centre of each cell 13, after having been formed on these electrodes and after having diffused towards each other. Such neutralisation results in a higher consumption of electric current. Simultaneously, owing to this neutralisation, the light transmission of the system 100 in the dark state may achieve a saturation value greater than the minimum light transmission value that would result from the concentrations of the electroactive substances. In other words, the mutual neutralisation of the electroactive substances may reduce the dynamics of the system 100.

A first method for avoiding such a mutual neutralisation of the electroactive substances consists of increasing the thickness d of the volume V in the direction D. In this manner, the oxidised and reduced forms of the electroactive substances that are formed on opposite electrodes must diffuse over greater lengths before mutual neutralisation takes place.

According to a second method for avoiding the mutual neutralisation of the electroactive substances, the system 100 may further comprise a separation film that is arranged parallel to the outer walls 10 and 11, between the latter, so as to divide the volume V into a first sub-volume $V_1$ in contact with the electrodes 1 and 2, and a second sub-volume $V_2$ in contact with the electrodes 3 and 4. Such a separation film, referenced 5, is sealed for the first and second electroactive substances. Although the film 5 is only shown in FIG. 3b, it may be used identically in the device in FIG. 2b.

For the device in FIG. 3b particularly, the film 5 may form an ion bridge between the sub-volumes $V_1$ and $V_2$ within each cell 13. For example, it may be permeable to ions of small sizes that are contained in the liquid or gel with the electroactive substances. It is therefore no longer necessary for the sources 20 and 21 to be set to deliver electrical currents to the system 100 that are substantially equal at each moment. For example, the film 5 may be made of Nafion®, with a thickness of approximately 50 μm in the direction D. This material, designed by Nafion®, is well known to a person skilled in the art. In particular, it comprises perfluorinated alkanes on which sulphonic acid groups are branched.

Figure 4A:
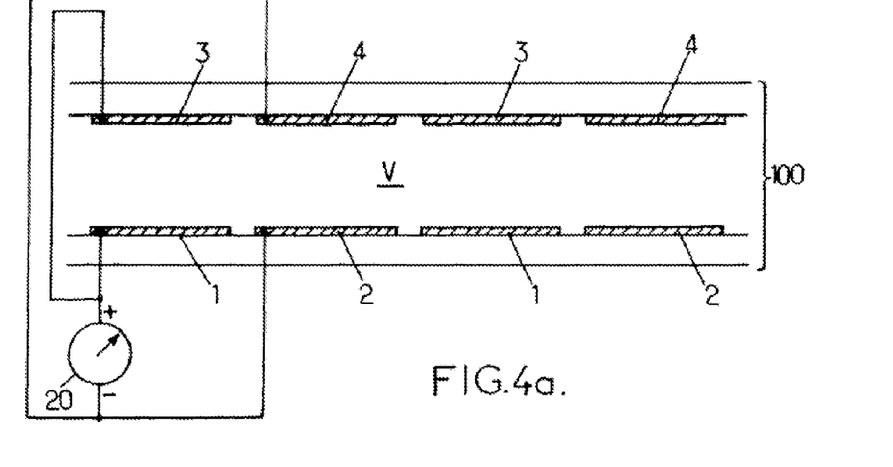
FIGS. 4a and 4b show other variant embodiments of the invention.
Figure 4B:
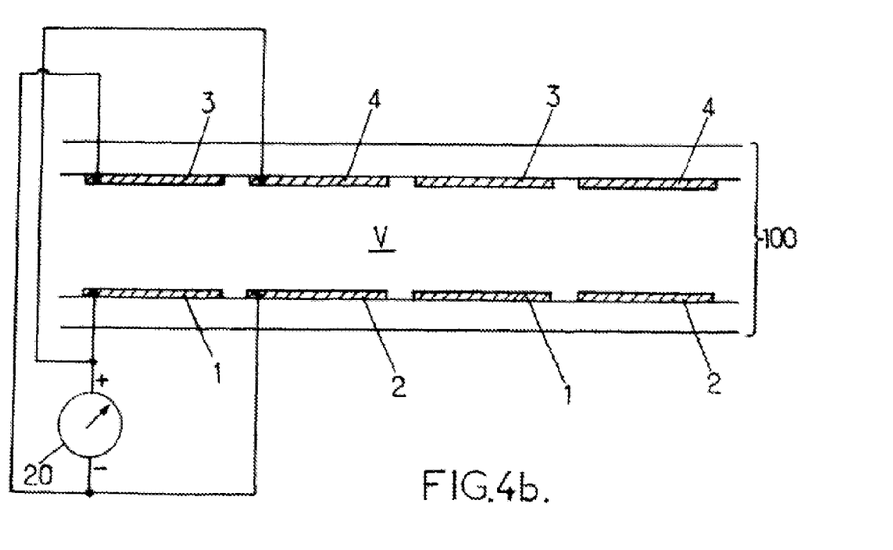

FIGS. 4a and 4b show other embodiments of the invention, with a single variable electrical source. The inner walls 12 have not been shown in these two figures, given that they are optional for the whole invention, possibly arranged according to FIG. 1a or FIG. 1b, in particular. The devices in FIGS. 4a and 4b are also distinguished by the polarity of the supply electrodes which are opposite each other. The electrodes 1 and 3 have identical polarities in the device in FIG. 4a, and also the electrodes 2 and 4 with the opposite polarity. To this end, the electrodes 1 and 3 are electrically connected in parallel to one of the output terminals of the single source 20, and the electrodes 2 and 4 are connected in parallel to the other output terminal of the source 20. The polarity of the electrodes 1 and 3 on the one hand, with that of the electrodes 2 and 4 on the other hand, is of course reversed according to whether the system 100 is switched to the dark state or to the clear state.

Conversely, the opposite electrodes have opposite polarities in the single electrical source device of FIG. 4b. To this end, the electrodes 1 and 4 are electrically connected in parallel to one of the output terminals of the single source 20, and the electrodes 2 and 3 are connected in parallel to the other output terminal of the source 20.

It is understood that the invention may be reproduced by adapting features that have been mentioned by way of example, while retaining at least some of the advantages mentioned. In particular, a person skilled in the art will understand that the electrodes of the two pairs introduced by the invention are not necessarily opposite, despite such a configuration being preferred. Moreover, the concentration values and/or dimensions of the elements of the electrochromic system may be modified for each application considered. Further ionic substances may also be added to the composition of the liquid or gel, in particular in order to increase its ionic conduction.

The invention claimed is:

1. A transparent electrochromic system, providing a clear vision through said system, and comprising:
    first and second outer walls defining a closed volume, the system being transparent for a direction of gaze passing through the outer walls and said closed volume between two opposite sides;
    a liquid or gel contained in the closed volume;
    first and second electroactive substances distributed in the liquid or gel, with respective oxidation-reduction potential values that are different, at least some of the first and second electroactive substances having an optical effect that varies between an oxidized form and a reduced form of said substances;
    a first pair of transparent supply electrodes, together supported by the first outer wall, and configured to be connected respectively to two output terminals of a first variable electrical source for supplying the system with electric current, so as to transfer electrons to or from at least some of the electroactive substances, in a reverse mode between said first and second electroactive substances at a same moment of operation of the system; and
    a second pair of transparent supply electrodes separate from the electrodes of the first pair, the electrodes of the second pair being together supported by the second outer wall, the supply electrodes of the second pair being configured to be connected respectively to two output terminals of a second variable electrical source, for supplying the system with electric current, additionally with respect to the first pair of electrodes, by also transferring electrons to or from at least some of the electroactive substances, in a reverse mode between said first and second electroactive substances at the same moment of operation of the system.

2. The system according to claim 1, in which the electrodes of each pair are situated one by one opposite the supply electrodes of the other pair, on either side of the closed volume in a direction perpendicular to the outer walls.

3. The system according to claim 1, forming at least one portion of a spectacle eyeglass, a goggles eyeglass, an optical lens, a helmet visor, an airplane window or a glazing.

4. The system according to claim 1, further comprising a network of inner walls forming a partition of the closed volume into cells that are juxtaposed parallel to the outer walls, said inner walls being perpendicular to said outer walls, and in which the two supply electrodes of each pair are each in contact with the liquid or gel contained in each cell, and the liquid or gel contained in said cell containing both the first and second electroactive substances.

5. The system according to claim 1, further comprising a network of inner walls forming a partition of the closed volume into cells that are juxtaposed parallel to the outer walls, said inner walls being perpendicular to said outer walls, and in which, for at least some of the cells, a single one of the two electrodes of the first pair and a single one of the two electrodes of the second pair are in contact with the liquid or gel contained in each cell, a first one of said cells that is supplied by one of the supply electrodes of each pair being adjacent to a second one of said cells that is supplied by the other electrode of each pair.

6. The system according to claim 5, in which the liquid or gel contains first electroactive substances without second electroactive substances within the cells supplied by one of the supply electrodes of each pair, and second electroactive substances without first electroactive substances within the cells supplied by the other electrode of each pair.

7. An electrochromic device comprising:
    a transparent electrochromic system according to claim 1;
    the first variable electrical source, with the two output terminals of said first electrical source connected respectively to the supply electrodes of the first pair, and configured to also supply the system with electric current by applying between said electrodes of the first pair a first electrical voltage that is greater than the difference between the respective oxidation-reduction potential values of the first and second electroactive substances; and
    the second variable electrical source, with the two output terminals of said second electrical source connected respectively to the supply electrodes of the second pair, and configured to also supply the system similarly with electric current by applying between said electrodes of the second pair a second electrical voltage also greater than said difference between the respective oxidation-reduction potential values of the first and second electroactive substances.

8. The device according to claim 7, in which the first and second electrical sources are configured to supply the electrochromic system with electric current simultaneously.

9. The device according to claim 7, in which the first and second electrical sources each have an electrical potential reference terminal separate from the output terminals of said electrical sources, said electrical potential reference terminals being electrically connected to each other.

10. The device according to claim 7, in which the electrodes of each pair are situated one by one opposite the supply electrodes of the other pair, on either side of the closed volume in a direction perpendicular to the outer walls, and in which the first and second electrical sources are connected to the electrodes of the first and second pairs, respectively, so that said first and second electrical sources have respective polarities that are identical with respect to the electrodes situated opposite, at some moments at least of the operation of the system.

11. The device according to claim 10, in which:
    the electrochromic system includes a network of inner walls forming a partition of the closed volume into cells that are juxtaposed parallel to the outer walls, said inner walls being perpendicular to said outer walls;
    for at least some of the cells a single one of the two electrodes of the first pair and a single one of the two electrodes of the second pair are in contact with the liquid or gel contained in each cell, a first one of said cells that is supplied by one of the supply electrodes of each pair being adjacent to a second one of said cells that is supplied the other electrode of each pair; and
    an ion bridge between neighboring cells is supplied respectively by different electrodes of each pair of electrodes.

12. The device according to claim 10, in which the liquid or gel contains first electroactive substances without second electroactive substances within the cells supplied by one of the supply electrodes of each pair, and second electroactive substances without first electroactive substances within the cells supplied by the other electrode of each pair.

13. The device according to claim 7, in which:
the electrodes of each pair are situated one by one opposite the supply electrodes of the other pair, on either side of the closed volume in a direction perpendicular to the outer walls;
the first and second electrical sources are connected to the electrodes of the first and second pairs, so that said first and second electrical sources have respective polarities that are reversed with respect to the electrodes situated opposite, at some moments at least of the operation of the system, and
the liquid or gel contained in each cell contains both first and second electroactive substances.

14. The device according to claim 13, in which:
the electrochromic system includes a network of inner walls forming a partition of the closed volume into cells that are juxtaposed parallel to the outer walls, said inner walls being perpendicular to said outer walls;
the two supply electrodes of each pair are each in contact with the liquid or gel contained in each cell, and the liquid or gel contained in said cell containing both the first and second electroactive substances; and
the inner walls form an electrical insulation between neighboring cells.

15. The device according to claim 13, in which the electrochromic system further comprises a separation film arranged parallel to the outer walls and between said outer walls so as to divide the closed volume into a first sub-volume in contact with the electrodes of the first pair, and a second sub-volume in contact with the electrode of the second pair.

16. The device according to claim 15, in which the separation film forms an ion bridge between the first and the second sub-volume.

17. The device according to claim 13, in which:
the electrochromic system includes a network of inner walls forming a partition of the closed volume into cells that are juxtaposed parallel to the outer walls, said inner walls being perpendicular to said outer walls;
for at least some of the cells, a single one of the two electrodes of the first pair and a single one of the two electrodes of the second pair are in contact with the liquid or gel contained in each cell, a first one of said cells that is supplied by one of the supply electrodes of each pair being adjacent to a second one of said cells that is supplied by the other electrode of each pair; and
the inner walls form an electrical insulation between neighboring cells.

\* \* \* \* \*

UNITED STATES PATENT AND TRADEMARK OFFICE
CERTIFICATE OF CORRECTION

PATENT NO.         : 8,542,426 B2                                      Page 1 of 1
APPLICATION NO.    : 13/497217
DATED              : September 24, 2013
INVENTOR(S)        : Samuel Archambeau et al.

It is certified that error appears in the above-identified patent and that said Letters Patent is hereby corrected as shown below:

Title Page, Item (73):
"Essilor International (Compagnie Generale d'Optique), Charenton-le-Pont (FR)" should read,
--Essilor International (Compagnie Generale D'Optique), Charenton-le-Pont (FR)--.

In the Claims:

Column 10, Line 56:
"for at least some of the cells a single one of the two electrodes" should read, --for at least some of the cells, a single one of the two electrodes--.

Column 10, Lines 61-62:
"being adjacent to a second one of said cells that is supplied the other electrode of each pair; and" should read, --being adjacent to a second one of said cells that is supplied by the other electrode of each pair; and--.

Column 12, Line 5:
"arranged parallel to the outer walls and between said outer" should read, --arranged parallel to the outer walls, and between said outer--.

Signed and Sealed this
Third Day of June, 2014

Michelle K. Lee
*Deputy Director of the United States Patent and Trademark Office*